Figure 1:
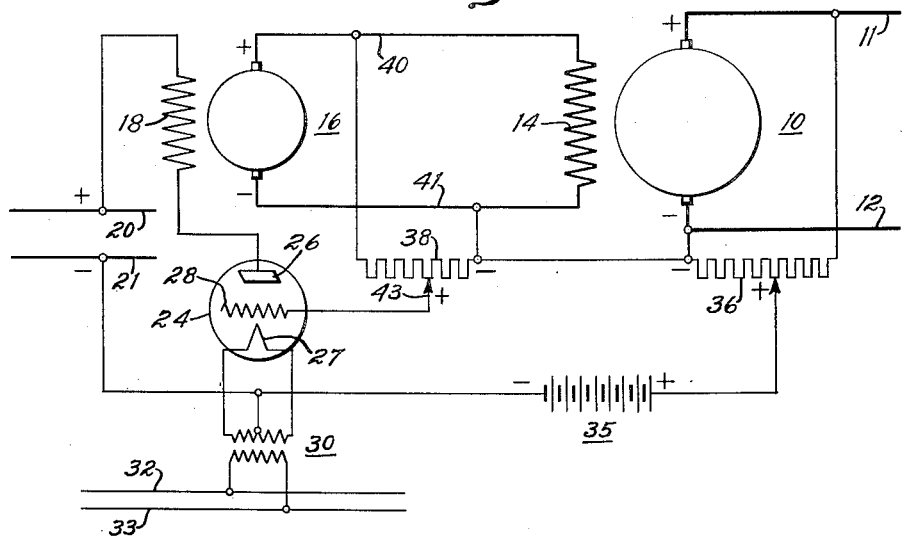

May 16, 1933.  F. H. GULLIKSEN  1,909,104

REGULATOR COMPENSATOR

Filed Oct. 13, 1931

WITNESSES:
R. S. Williams
C. F. Bryant

INVENTOR
Finn H. Gulliksen.

BY Franklin E. Hardy
ATTORNEY

Patented May 16, 1933

1,909,104

UNITED STATES PATENT OFFICE

FINN H. GULLIKSEN, OF WILKINSBURG, PENNSYLVANIA, ASSIGNOR TO WESTING-
HOUSE ELECTRIC & MANUFACTURING COMPANY, A CORPORATION OF PENNSYL-
VANIA

REGULATOR COMPENSATOR

REISSUED

Application filed October 13, 1931. Serial No. 568,538.

My invention is directed to regulator compensators and has particular relation to load compensators for electronic-tube generator-voltage regulators.

In the application of voltage regulators to electrical generators, it is frequently desired that the regulator change the value of voltage which it maintains as the load supplied by the generator changes. For example, where it is necessary to maintain constant the voltage at a point distant from the generator that energizes the circuit, load-compensating means for the regulator are required because the voltage drop along the circuit conductors changes as the load on the circuit changes.

I have discovered that the desired compensation may be advantageously effected in the case of electronic-tube regulators by taking advantage of the fact that as the load on a generator is increased, greater excitation is required to maintain the terminal voltage of the generator at a substantially constant value. I have accordingly devised electronic-tube-regulator compensating means energized in accordance with the generator excitation rather than by the generator output and have found that, by the use of such an expedient, substantial savings in the cost of the compensating equipment may be effected.

It is, accordingly, an object of my invention to provide a load compensator for an electronic-tube regulator applied to a dynamo-electric machine which operates in accordance with changes in the excitation of the machine.

A further object of my invention is to provide a compensator of the type described which is particularly applicable to voltage regulators for electrical generators having separate exciters or other equivalent sources of field-winding-energizing current.

A still further object of my invention is to provide a load compensator for a generator-voltage regulator utilizing an electronic tube control-grid circuit, in which the additional equipment required is exceedingly small and inexpensive.

In practicing my invention I provide means for introducing into the control-grid circuit of the generator-voltage-influenced electron tube a modifying- or compensating-control potential which varies in accordance with the excitation of the regulated generator.

My invention is particularly applicable to regulators for separately-excited generators, for in such applications I am permitted to attain the desired compensation merely by including in the grid-control circuit referred to, a resistor that is energized either in accordance with the voltage of the generator field winding or in accordance with the exciting current caused to flow through the winding. By this simple and inexpensive expedient I am able to change the value of the generated voltage in accordance with the changes in the load supplied by the generator.

Figure 2:
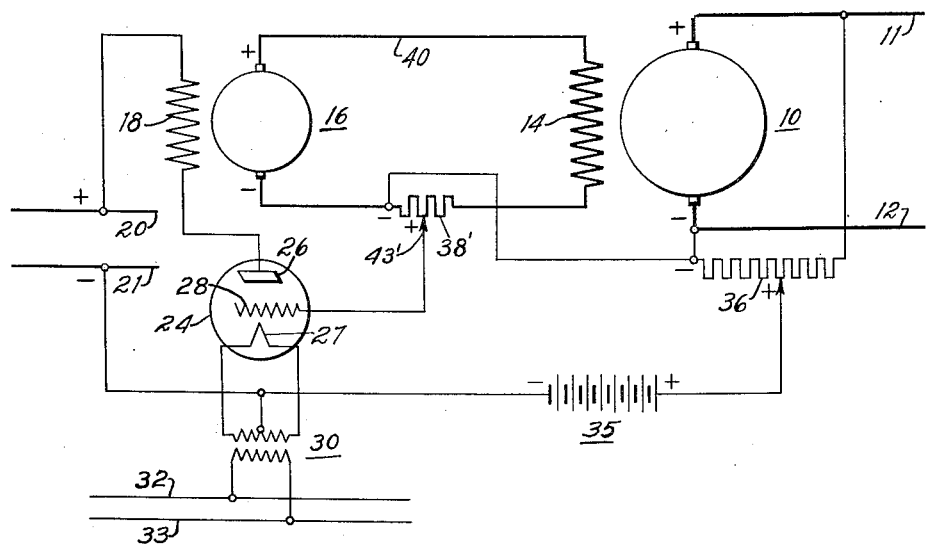

My invention will best be understood from the following description of a specific embodiment thereof, when read together with the accompanying drawing, in which:

Figure 1 is a diagrammatic view of apparatus and circuits illustrating a preferred form of my invention applied to an electronic-tube voltage regulator for a direct-current generator having a separate exciter, and Fig. 2 is a diagramamtic representation illustrating a second preferred form of my invention. In the form of the invention disclosed in Fig. 2 the compensating resistor disposed in the vacuum-tube grid circuit is energized by the current flowing in the generator-field winding circuit, instead of from the voltage applied to energize the winding as in the modification shown in Fig. 1.

Referring to Fig. 1 of the drawing, the generator to be regulated is indicated at 10, it comprising armature windings connected with circuit conductors 11 and 12 and a field winding 14. A separate exciting generator 16, having a field winding 18 is connected, in well known manner, to energize the generator field winding 14. Energizing current for the exciter-field winding 18 may be supplied from any suitable source such as from direct-current-energized circuit conductors 20 and 21.

The electronic-tube regulating system illustrated in the drawing is shown in simplified form in order that the functioning of my invention therein may be more clearly indicated. As illustrated, it comprises a single three-element vacuum tube 24 having anode and cathode elements 26 and 27, respectively, disposed in the energizing circuit of the exciter field winding 18, and a grid or control element 28. Heating current for the cathode or filament 27 may be supplied in any suitable manner such as through a transformer 30 energized from the alternating current circuit conductors 32 and 33.

The grid element 28 of the vacuum tube 24 is connected in a control circuit which includes a standard potential battery 35 connected to act in opposition with the voltage of the regulated generator 10, a potentiometer or voltage-adjusting resistor 36 being included in this grid circuit, which is completed through a resistor 38 that forms a part of the load compensator of my invention.

In the modification of the compensator illustrated in Fig. 1, resistor 38 is energized from the voltage impressed upon field winding 14, connection with the exciter or winding energizing conductors 40 and 41, which are of positive and negative polarities, respectively, being made in the manner shown.

In the operation of the regulating system shown in Fig. 1, the voltage of the generator 10 will be so controlled that the potential drop in that portion of resistor 36 included in the grid-control circuit is slightly greater than that of the standard potential battery 35, thus causing the potential of the grid element 28 of the vacuum tube 24 to be maintained at a negative value with respect to the cathode 27. For a particular value of tube grid bias, the tube passes the proper amount of current to energize winding 18 sufficiently to maintain the desired generator voltage to maintain the voltage of generator 10 at the normal or desired value mentioned.

A decrease in the voltage between conductors 11 and 12, from which resistor 36 is energized, reduces the value of negative grid bias impressed upon the vacuum tube 24, thereby increasing the conducting properties of the tube and causing the excitation and voltage of exciter 16 to be increased. This results in a corresponding increase in the excitation of generator 10 and the desired correction of the generator voltage.

Similarly, an increase in the voltage of generator 10 acts to increase the value of negative bias impressed upon vacuum tube 24 and to thus effect a decrease in the voltage of the exciter 16 and of the excitation of the generator 10 which results in a lowering of the generator voltage back to the desired value.

Without the use of the resistor 38 in the grid control circuit, it will be seen that the regulating system just described will maintain the voltage of the regulated generator 10 at substantially the same value independently of the loading of the generator. The change in value of grid bias required to change the exciting current of the exciter 16 from the no load value of the regulated generator to the full load value is a very small fraction of the generator voltage. It will be seen that the effect of this grid bias change for the different generator load conditions is to give the generator a slightly drooping voltage with increase in load.

The action of the compensating means of my invention causes the regulator to effect an increase in voltage as the load increases. The resistor 38 introduces into the control-grid circuit a potential which varies in accordance with the excitation of the regulated generator and hence in accordance with the load carried by the generator. It will be seen that this relation exists since as the load on the generator is increased, the voltage drop in the generator windings is proportionately increased, which necessitates that the induced voltage, and hence the excitation, be correspondingly increased with increasing load in order that the terminal voltage be maintained at the desired value. In practice, it is found that this relation between generator load and excitation is sufficiently constant to permit of highly satisfactory load compensation.

Thus, in the system of Fig. 1, when the generator 10 is operating at low load values, the exciter voltage required to energize the field winding 14 is relatively low and the compensating potential introduced into the grid circuit of vacuum tube 24, by the voltage drop across the resistor 38, is correspondingly low. It will be observed that the polarity of this compensating potential is such, in the system of Fig. 1, that it bucks the voltage introduced into the grid circuit from the generator through the resistor 36, and adds to that introduced by the standard potential battery 35.

As the load on the generator 10 is increased, a greater excitation of the field winding is required to maintain the terminal voltage. The action of the regulator causes the compensating potential introduced into the grid circuit to be increased in accordance with the increase in the exciter voltage. By thus, in effect, adding to the voltage impressed upon the grid circuit by standard potential battery 35, this increased compensating potential lowers the value of negative grid bias impressed upon tube 24 and thus causes the regulator to maintain the generator voltage at a correspondingly higher value, as an analysis of the grid control circuit will indicate. Consequently, in the connection shown in Fig. 1, the compensating means of my invention act in the manner to produce a rising-voltage-with load characteristic of the regulator. The magnitude or degree of compensation, or the rate at which the compensating voltage is changed as the generator load changes may be controlled by including greater or lesser portions of resistor 38 in the grid-control circuit, such control being effected in the system of Fig. 1 by shifting a tap connection 43 along resistor 38.

It will be evident that a reversal in the connections of the resistor 38 will cause the compensating action to function in the opposite manner to that just explained or to effect a lowering-voltage-with-load characteristic of the regulating system, should such be desired.

It will be apparent that ararngements other than that shown in Fig. 1 may be utilized for introducing into the grid control circuit a compensating potential that varies in accordance with the excitation of the regulated generator. One such alternative scheme is shown in Fig. 2 in which the load compensating resistor 38' is connected in series-circuit relation with the energizing circuit of the generator field winding 14 instead of in parallel relation to this winding.

In Fig. 2, the regulated generator 10 and the associated vacuum tube voltage regulating equipment is represented as being similar to that shown and described in Fig. 1, with the exception of the modification in the load compensating means already mentioned. Consequently, a detailed description of the operation of the complete regulating system will not here be repeated. It can be seen that the effect of the resistor 38' in the grid control circuit of vacuum tube 24 is similar to that of resistor 38 shown in Fig. 1, since an increase in generator excitation, which accompanies an increase in the load of the generator, proportionately increases the voltage drop in the resistor 38' and thereby effects a rising voltage compensation with an increase in load. As in the system of Fig. 1, a reversal of the connections of resistor 38' of Fig. 2 changes the compensation from a rising to a lowering voltage compensation and a shift in the position of tap connection 43' effects an adjustment of the magnitude of the compensation.

It will be understood that the load-compensating means of my invention may be applied to any electrical generator having a separate exciting source controllable by electron tube means having a grid-control circuit acted upon by a potential influenced by the voltage of the regulated generator, in which circuit the excitation-responsive compensating potential may be introduced by any suitable means. Hence my invention is applicable to a wide variety of electronic-tube regulators, including the more complicated types now known and utilized in the art.

While I have shown and described certain specific embodiments of my invention, I am fully aware that many further modifications thereof are possible. My invention, therefore, is not to be restricted except insofar as is necessitated by the prior art and by the spirit of the appended claims.

I claim as my invention:

1. The combination with a dynamo-electric machine having a field winding, means for supplying an energizing current to said winding, means, comprising an electronic tube having a control-grid element, for controlling said energizing current, and a circuit for impressing upon said grid element a control potential determined by an electric characteristic of the said machine, of means for introducing into said grid circuit a compensating potential that varies in accordance with the current in the field winding of said machine.

2. The combination with a dynamo-electric machine having a field winding, an exciter for energizing said field winding, means, comprising an electronic tube having a control-grid element for adjusting the voltage of said exciter, and a circuit for impressing upon said grid element a control potential determined by an electric characteristic of the said machine, of means for introducing into said grid circuit a modifying potential that varies in accordance with the voltage impressed upon said machine-field winding.

3. The combination with a dynamo-electric machine having a field winding, an exciter for energizing said winding, means, comprising an electronic tube having a control-grid element, for adjusting the voltage of said exciter, and a circuit for impressing upon said grid element a control potential determined by a characteristic of the said machine, of means for introducing into said grid circuit a modifying potential that varies in accordance with the current energizing said machine-field winding.

4. In combination with an electrical generator having a field winding, means for supplying an exciting current to said winding, and a regulator, for controlling the voltage of said generator, comprising electronic-tube means having a grid element for controlling said field-winding current, and a circuit for impressing upon said grid element a control potential determined by the voltage of the generator, means for introducing into said grid circuit a load-compensating control potential that varies in accordance with the said field-winding current.

5. In combination with a regulator for an electrical generator, said regulator having an electron-tube disposed in a circuit for controlling the excitation of the generator in accordance with a potential impressed upon a grid element of said tube by a control circuit influenced by the generator voltage, generator-load-compensating means for said regulator comprising a resistor connected in said grid-element control circuit, said resistor being disposed to be acted upon by a current determined by the excitation of the generator.

6. In combination with a regulator for an electrical generator having a field winding and an exciter for energizing said winding, said regulator having an electron tube disposed in a circuit for controlling the voltage of said exciter in accordance with a potential impressed upon a grid element of said tube by a circuit influenced by the generator voltage, generator-load compensating means for said regulator comprising a resistor connected in said grid-element control circuit, and means for causing to flow through said resistor a current determined by the voltage of said exciter.

In testimony whereof, I have hereunto subscribed my name this 9th day of October 1931.

FINN H. GULLIKSEN.